United States Patent
Tang

(10) Patent No.: US 11,012,835 B2
(45) Date of Patent: May 18, 2021

(54) METHOD AND TERMINAL FOR ACQUIRING TRANSMISSION RESOURCE IN VEHICLE TO EVERYTHING

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/464,040

(22) PCT Filed: Nov. 1, 2017

(86) PCT No.: PCT/CN2017/108937
§ 371 (c)(1),
(2) Date: May 24, 2019

(87) PCT Pub. No.: WO2019/084847
PCT Pub. Date: May 9, 2019

(65) Prior Publication Data
US 2019/0387376 A1    Dec. 19, 2019

(51) Int. Cl.
*H04W 4/40* (2018.01)
*H04W 48/16* (2009.01)
*H04W 72/02* (2009.01)
*H04W 74/08* (2009.01)

(52) U.S. Cl.
CPC ............. *H04W 4/40* (2018.02); *H04W 48/16* (2013.01); *H04W 72/02* (2013.01); *H04W 74/0808* (2013.01)

(58) Field of Classification Search
CPC ....... H04W 4/40; H04W 48/16; H04W 72/02; H04W 74/0808
See application file for complete search history.

(56) References Cited

U.S. PATENT DOCUMENTS

| | | | |
|---|---|---|---|
| 2012/0113941 A1* | 5/2012 | Chung | H04W 72/04 |
| 2017/0188391 A1* | 6/2017 | Rajagopal | H04W 74/08 |
| 2018/0020387 A1* | 1/2018 | Van Der Velde | H04W 36/30 |

(Continued)

FOREIGN PATENT DOCUMENTS

| | | |
|---|---|---|
| CN | 105101300 A | 11/2015 |
| CN | 106470485 A | 3/2017 |
| CN | 107295466 A | 10/2017 |

OTHER PUBLICATIONS

ZTE, Discussion on the use of exceptional pool, 3GPP_TSG_RAN_WG2_Meeting97_R21700790, Feb. 17, 2017.

(Continued)

*Primary Examiner* — Ronald B Abelson

(57) ABSTRACT

A method and a terminal for acquiring a transmission resource in vehicle to everything are provided. In the implementations of the present disclosure, available resources in a current resource pool are sensed, and if the terminal needs to send data before a sensing result is acquired, whether the current resource pool permits random selection of a transmission resource is determined, if the current resource pool permits the random selection of a transmission resources, a transmission resource is randomly selected from the current resource pool.

10 Claims, 1 Drawing Sheet

(56) References Cited

U.S. PATENT DOCUMENTS

2018/0092065 A1* 3/2018 Sheng .................. H04W 72/02
2019/0313405 A1* 10/2019 Li ..................... H04W 72/0446
2020/0059896 A1* 2/2020 Xu ....................... H04W 72/02

OTHER PUBLICATIONS

LG Electronics, Exceptional pool handling in RRC, R2_167008_ExceptionalPoolHandlinginRRC, Oct. 10, 2016.
European Search Report dated Dec. 2, 2019 from Application No. 17930711.1.
3GPP TSG RAN WG1 Meeting #88; R1-1702141; Athens, Greece Feb. 13-17, 2017.
3GPP TSG RAN WG1 Meeting #88; R1-1701621; Athens, Greece Feb. 13-17, 2017.
3GPP TSG RAN WG1 #88; R1-1702864; Athens, Greece Feb. 13-17, 2017.
3GPP TSG-RAN WG2 Meeting #97bis; R2-1702910; Spokane, USA, Apr. 3-7, 2017.
English translation of China Office Action for CN application 201780050357.2 dated May 12, 2020.
Second Chinese Office Action with English Translation for Chinese Application No. 201780050357.2 dated Dec. 15, 2020.

\* cited by examiner

METHOD AND TERMINAL FOR ACQUIRING TRANSMISSION RESOURCE IN VEHICLE TO EVERYTHING

CROSS-REFERENCE TO RELATED APPLICATION(S)

This application is a 371 application of International Application No. PCT/CN2017/108937, filed on Nov. 1, 2017, the entire disclosure of which is hereby incorporated by reference.

TECHNICAL FIELD

The present disclosure relates to the Vehicle to Everything (V2X) technology, more particularly, to a method and a terminal for acquiring a transmission resource in V2X.

BACKGROUND

A Vehicle to Everything (V2X) system adopts a direct communication mode of terminal-to-terminal, which has higher spectral efficiency and lower transmission delay. In the V2X system, two types of terminals are usually involved, one is Vehicle User Equipment (VUE) and the other is Pedestrian User Equipment (PUE).

Generally, due to factors such as a power supply mode of the equipment, processing capability of the VUE is higher than that of the PUE. The VUE has full sensing capability, while the PUE has partial sensing capability or no sensing capability. In a process of data transmission, the VUE and the PUE with partial sensing capability can sense available resources in a current resource pool, and randomly select a transmission resource from the available resources for data transmission.

However, the sensing requires certain processing time, for example, 1 s, etc. When the sensing is not finished, the terminal cannot acquire a sensing result. At this time, if the terminal needs to send data, the terminal may randomly select a transmission resource from a pre-configured exceptional resource pool to send the data. In this mode, the exceptional resource pool needs to be additionally configured, which increases spectrum fragments, and reduces the overall amount of available resources.

SUMMARY

Various aspects of the present disclosure provide a method and a terminal for acquiring a transmission resource in vehicle to everything (V2X), to improve the overall amount of available resources.

In an aspect of the present disclosure, a method for acquiring transmission resources in vehicle to everything (V2X) is provided, which includes: sensing available resources in a current resource pool; if a terminal needs to send data before a sensing result is acquired, determining whether the current resource pool permits random selection of a transmission resource; and if the current resource pool permits the random selection of a transmission resource, randomly selecting a transmission resource from the current resource pool.

In another aspect of the present disclosure, a terminal is provided, which includes: a sensing unit, used for sensing available resources in a current resource pool; a determination unit used for, if the terminal needs to send data before the sensing unit acquires a sensing result, determining whether the current resource pool permits random selection of a transmission resource; and a selection unit used for if the current resource pool permits the random selection of a transmission resource, randomly selecting a transmission resource from the current resource pool.

BRIEF DESCRIPTION OF DRAWINGS

In order to explain the technical schemes of the implementations of the present disclosure more clearly, the drawings that are referred to in the description of the implementations or the prior art will be briefly introduced below. Obviously, the drawings in the following description are only some implementations of the present disclosure. For those of ordinary skill in the art, other drawings can be obtained according to these drawings without an inventive effort.

DETAILED DESCRIPTION

Figure 1:
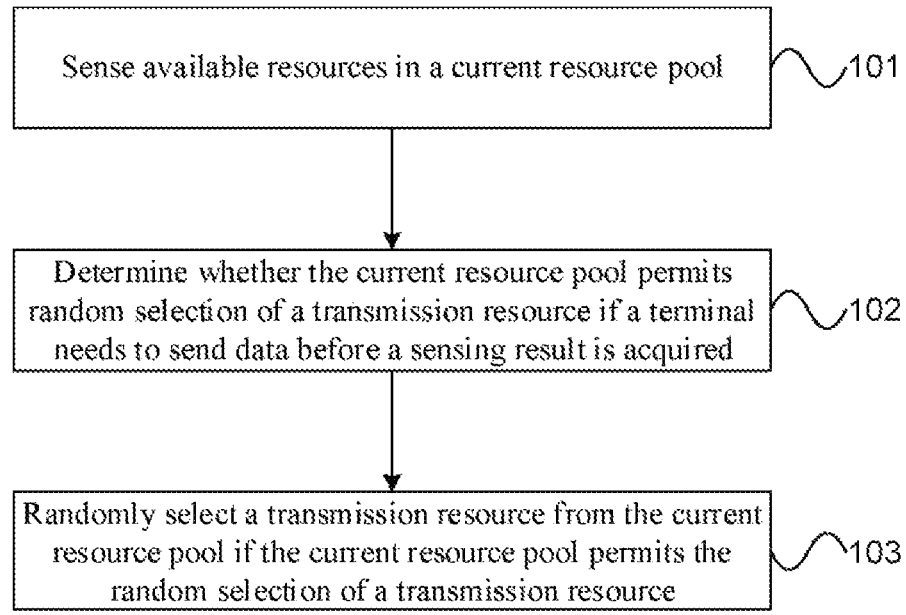
FIG. 1 is a schematic flow chart of a method for acquiring a transmission resource in vehicle to everything according to an implementation of the present disclosure.

In order to make the purpose, technical solutions and advantages of implementations of the present disclosure more clearly, the technical solutions in the implementations of the present disclosure will be described clearly and completely in the following with reference to the drawings in the implementations of the present disclosure. Obviously, the described implementations are parts, but not all, of the implementations of the present disclosure. Based on the implementations of the present disclosure, all other implementations obtained by a person of ordinary skill in the art without paying an inventive effort should fall within the protection scope of the present disclosure.

In a V2X system, communication between terminals may be based on various wireless communication systems, such as a Long Term Evolution (LTE) system, etc. The V2X technology is a Sidelink (SL) transmission technology, different from the traditional wireless communication system in which data is received or transmitted through network devices, the V2X system adopts a direct communication mode of terminal-to-terminal, thereby, higher spectral efficiency and lower transmission delay can be obtained in the V2X system.

In Release 14 (Rel-14) of the 3rd generation partnership project (3GPP), the V2X is standardized, and two transmission modes are defined, which are mode 3 and mode 4.

In mode 3, a transmission resource of a VUE is allocated by a network device, and the VUE may transmit data on a sidelink according to the transmission resource allocated by the network device. The network device may allocate the transmission resource for a single transmission for the terminal, or may allocate the transmission resource for the terminal in a semi-static way.

In mode 4, the VUE adopts a transmission mode of sensing and reservation. The VUE acquires a plurality of available resources in a current resource pool by sensing, and randomly selects a transmission resource from the plurality of available resources to send data. Due to periodicity of services in the V2X system, generally the terminal may adopt a semi-static transmission mode, that is, after randomly selecting a transmission resource, the terminal will continuously use the transmission resource in multiple transmission periods, thereby, probabilities of resource reselection and resource conflict are reduced. The terminal may carry information of a transmission resource reserved for next transmission in control information sent in a current time, so that other terminals may determine whether the resource is reserved and used by the terminal by detecting the control information of the terminal, thereby a purpose of reducing resource conflict is achieved.

In Rel-14, both the VUE and the PUE support the two transmission modes of mode 3 and mode 4.

In a process of sending data in the mode 4, the VUE and the PUE with partial sensing capability may sense available resources in the current resource pool, and randomly select a transmission resource from the available resources to send data.

However, the sensing requires certain processing time, for example, 1 s, etc. When the sensing is not finished, the terminal is unable to acquire a sensing result. At this time, if the terminal needs to send data, the terminal may randomly select a transmission resource from a pre-configured exceptional resource pool to send the data. In this mode, the exceptional resource pool needs to be additionally configured, which increases spectrum fragments, and reduces the overall amount of available resources.

The term "and/or" in this document is merely used to describe an association relationship between associated objects, indicating that there may be three relationships, for example, a and/or b may indicate three situations: A alone, A and B, and B alone. In addition, the symbol "/" in this document generally indicates that objects of the former and the latter connected by "/" has an "or" relationship.

FIG. 1 is a flow chart of a method for acquiring a transmission resource in vehicle to everything according to an implementation of the present disclosure. FIG. 1 shows acts 101-103.

In 101: available resources in a current resource pool are sensed.

In 102: if a terminal needs to send data before a sensing result is acquired, whether the current resource pool permits random selection of a transmission resource is determined.

In 103: if the current resource pool permits the random selection of a transmission resource, a transmission resource is randomly selected from the current resource pool.

After the selected transmission resource is acquired, the transmission resource may be used to send the data.

It should be noted that an object for performing 101 to 103 may be a terminal. It should be understood that in the present disclosure, the terminal needs to be configured as permitting random selection of a transmission resource.

The terminal involved in the present disclosure may be a VUE or may be a PUE with sensing capability, which is not particularly limited in the implementation.

It should be noted that the PUE involved in the implementation of the present disclosure may include, but not limited to, a mobile phone, a personal digital assistant (PDA), a wireless handheld device, a tablet computer, a personal computer (PC), a moving picture experts group audio layer 3 (MP3) player, a moving picture experts group audio layer 4 (MP4) player, a wearable device (e.g., smart glasses, a smart watch, a smart bracelet), etc. The VUE involved in the implementation of the present disclosure, which may also be referred to as a vehicle machine, is a short name of a vehicle information entertainment product installed in a car. The vehicle machine is functionally capable of realizing information communication between people and the vehicle, and between the vehicle and an outside world (vehicle to vehicle).

As such, the available resources in the current resource pool are sensed, and if the terminal needs to send data before a sensing result is acquired, whether the current resource pool permits the random selection of a transmission resource is determined, if the current resource pool permits the random selection of a transmission resource, a transmission resource is randomly selected from the current resource pool, without the need of additionally configuring an exceptional resource pool, thus avoiding the technical problem that the spectrum fragments are increased due to the additional configuration of the exceptional resource pool in the prior art, and improving the overall amount of the available resources.

Optionally, in a possible implementation, in 101, the terminal may specifically sense the available resources in the current resource pool in the process of using the mode 4 for sending data. Generally, the terminal needs certain processing time for the sensing, for example, 1 s, etc. When sensing is not finished, the terminal is unable to acquire the sensing result.

Optionally, in a possible implementation, in 102, the terminal may specifically acquire configuration information of the current resource pool, and the terminal may determine whether the current resource pool permits random selection of a transmission resource according to the configuration information of the current resource pool.

In a specific implementation process, the terminal may specifically acquire the configuration information of the current resource pool from a network device.

Specifically, the network device may be a network element, such as, an Evolved NodeB (eNB) in an LTE system, which is not particularly limited in the implementation.

Specifically, the terminal may specifically receive the configuration information sent by the network device through a high-level signaling or a system broadcast message.

For example, the high-level signaling may be a radio resource control (RRC) message. Specifically, the configuration information may be carried by an Information Element (IE) in the RRC message, and the RRC message may be an RRC message in the prior art, for example, an RRC CONNECTION RECONFIGURATION message, etc., which is not limited in the implementation. The configuration information may be carried by expanding IE of an existing RRC message, or the RRC message may be different from existing RRC messages in the prior art.

For another example, the high-level signaling may be a media access control (MAC) control element (CE) message, and the configuration information may be specifically carried by adding a new MAC CE message.

For another example, the configuration information may be specifically carried by using a reserved bit in an existing master information block (MIB) or system information block (SIB) in the system broadcast message, or carried by adding a new SIB.

In another specific implementation process, the terminal may specifically acquire the configuration information of the current resource pool from a user card of the terminal.

Specifically, the user card of the terminal may include, but not limited to, a user identity module (UIM) card, a universal subscriber identity module (USIM) card, a subscriber identity module (SIM) card, or a personal identity module (PIM) card, which is not particularly limited in the implementation.

In another specific implementation process, the terminal may specifically acquire the configuration information of the current resource pool from equipment information of the terminal itself.

It should be noted that, in the present disclosure, when acquiring the configuration information of the current resource pool, the terminal may preferentially acquire the configuration information of the current resource pool from the network device. If the configuration information of the current resource pool is acquired from the network device, the terminal does not need to acquire the configuration information from the user card of the terminal or from the equipment information of the terminal itself. If the configuration information of the current resource pool is not acquired from the network device, then the terminal may acquire the configuration of the current resource pool from the user card of the terminal or from the equipment information of the terminal itself.

Optionally, in a possible implementation, in 103, if the current resource pool permits the random selection of a transmission resource, the terminal may directly randomly select a transmission resource from the current resource pool. Thus, there is no need to additionally configure an exceptional resource pool, and the technical problem that the spectrum fragments are increased due to the additional configuration of the exceptional resource pool in the prior art can be avoided, and the overall amount of the available resources is improved.

Optionally, in a possible implementation, after 102, if the current resource pool does not permit the random selection of a transmission resource, the terminal may randomly select a transmission resource from another resource pool.

Specifically, the terminal may adopt an existing technical solution to randomly select a transmission resource from an exceptional resource pool.

In the implementation, the available resources in the current resource pool are sensed, and if the terminal needs to send data before the sensing result is acquired, whether the current resource pool permits the random selection of a transmission resource is determined, if the current resource pool permits the random selection of a transmission resource, a transmission resource is randomly selected from the current resource pool, without the need of additionally configuring an exceptional resource pool, thus avoiding the technical problem that the spectrum fragments are increased due to the additional configuration of the exceptional resource pool in the prior art, and improving the overall amount of the available resources.

It should be noted that for the ease of description, the above method implementations are all described as a series of action combinations, but those skilled in the art should know that the present disclosure is not limited by the described sequence of the actions, because according to the present disclosure, some acts can be performed in other sequences or simultaneously. Secondly, those skilled in the art should also know that the implementations described in the specification are all preferred implementations, and the actions and modules involved are not necessarily essential for the present disclosure.

In the above implementations, there is respective emphasis in the description of each implementation. Related description of other implementations may be referred to for the parts not detailed in an implementation.

Figure 2:
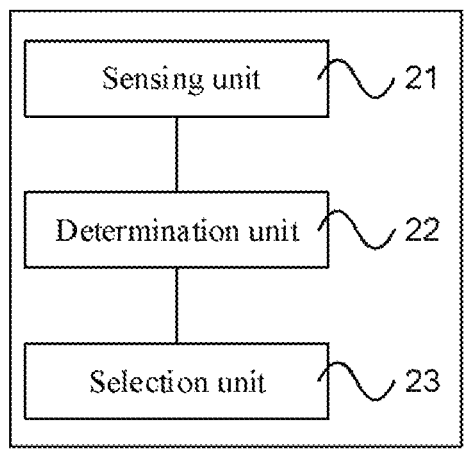
FIG. 2 is a schematic diagram of structure of a terminal according to another implementation of the present disclosure.

FIG. 2 is a schematic diagram of structure of a terminal according to another implementation of the present disclosure. As shown in FIG. 2, a terminal of the implementation may include a sensing unit 21, a determination unit 22, and a selection unit 23. The sensing unit 21 is used for sensing available resources in a current resource pool. The determination unit 22 is used for, if the terminal needs to send data before the sensing unit 21 acquires a sensing result, determining whether the current resource pool permits random selection of a transmission resource. The selection unit 23 is used for, if the current resource pool permits the random selection of a transmission resource, randomly selecting a transmission resource from the current resource pool.

The terminal involved in the present disclosure, may be a VUE or may be a PUE with sensing capability, which is not particularly limited in the implementation.

Optionally, in a possible implementation, the selection unit 23 may be further used for randomly selecting a transmission resource from another resource pool if the current resource pool does not permit the random selection of a transmission resource.

Specifically, the selection unit 23 is used for selecting a transmission resource randomly from an exceptional resource pool.

Optionally, in a possible implementation, the determination unit 22 may be specifically used for acquiring configuration information of the current resource pool; and determining whether the current resource pool permits the random selection of a transmission resource according to the configuration information of the current resource pool.

In a specific implementation process, the determination unit 22 may be specifically used for acquiring the configuration information of the current resource pool from a network device.

In another specific implementation process, the determination unit 22 may be specifically used for acquiring the configuration information of the current resource pool from a user card of the terminal.

In another specific implementation process, the determination unit 22 may be specifically used for acquiring the configuration information of the current resource pool from equipment information of the terminal, which is not particularly limited in the implementation.

It should be noted that the method in the implementation corresponding to FIG. 1 may be implemented by the terminal provided in the implementation. Relevant contents in the corresponding implementation of FIG. 1 may be referred to for detailed descriptions, which are not repeated here.

In the implementation, the sensing unit is used for sensing the available resources in the current resource pool, and then if the terminal needs to send data before the sensing unit acquires a sensing result, the determination unit is used for determining whether the current resource pool permits random selection of a transmission resource, so that the selection unit can randomly select a transmission resource from the current resource pool if the current resource pool permits the random selection of a transmission resource, and additional configuration of an exceptional resource pool is not need, thereby the technical problem that the spectrum fragments are increased due to the additional configuration of the exceptional resource pool in the prior art can be avoided, and the overall amount of the available resources is improved.

Those skilled in the art can clearly understand that, for convenience and conciseness of the description, the specific working processes of the system, device and unit described above may refer to the corresponding processes in the above method implementations, which are not described herein again.

In several implementations provided by the present disclosure, it should be understood that the disclosed systems, devices and methods may be implemented in other ways. For example, the device implementations described above are only illustrative. For example, the division of the units is only a logical function division, and there may be other division manners in actual implementation. For example, multiple units or components may be combined or integrated into another system, or some features may be ignored or not be performed. On the other hand, the mutual coupling or direct coupling or communication connection shown or discussed may be indirect coupling or communication connection through some interface, device or unit, and may be in electrical, mechanical or other forms.

The units described as separate units may or may not be physically separated, and the unit shown as a unit may or may not be a physical unit, i.e., it may be located in one place or may be distributed over multiple network elements. Some or all of the elements can be selected according to actual needs to achieve the purpose of the implementations.

In addition, various functional units in various implementations of the present disclosure may be integrated in one processing unit, or the various units may be physically present separately, or two or more units may be integrated in one unit. The integrated units can be implemented in the form of hardware or in the form of hardware plus software functional units.

Finally, it should be noted that the above implementations are only used to illustrate the technical solutions of the present disclosure, but not to limit the present disclosure. Although the present disclosure has been described in detail with reference to the foregoing implementations, it should be understood by those skilled in the art that the technical solutions described in the foregoing implementations may be modified or some of technical features thereof may be equally substituted. However, these modifications or substitutions do not make the essence of the corresponding technical solution depart from the spirit and scope of the technical solutions of various implementations of the present disclosure.

What I claim is:

1. A method for acquiring a transmission resource in vehicle to everything, comprising:
    sensing available resources in a current resource pool;
    when a terminal needs to send data before a sensing result is acquired, determining whether the current resource pool permits random selection of a transmission resource;
    when the current resource pool allows the random selection of a transmission resource, randomly selecting a transmission resource from the current resource pool; and
    when the current resource pool does not permit the random selection of a transmission resource, randomly selecting a transmission resource from another resource pool;
    wherein determining whether the current resource pool permits the random selection of a transmission resource comprises:
        acquiring configuration information of the current resource pool from a network device, and when the configuration information of the current resource pool is not successfully obtained from the network device, acquiring the configuration information of the current resource pool from a user card of the terminal or from equipment information of the terminal; and
        determining whether the current resource pool permits the random selection of a transmission resource, according to the configuration information of the current resource pool.

2. The method of claim 1, wherein the another resource pool comprises an exceptional resource pool.

3. The method of claim 1, wherein the terminal comprises a vehicle user equipment or a pedestrian user equipment with sensing capability.

4. A terminal, comprising hardware configured to execute instructions stored in a non-transitory computer readable medium to execute acts in following units:
    a sensing unit used for sensing available resources in a current resource pool;
    a determination unit used for, when the terminal needs to send data before the sensing unit acquires a sensing result, determining whether the current resource pool permits random selection of a transmission resource; and
    a selection unit, used for, when the current resource pool permits the random selection of a transmission resource, randomly selecting a transmission resource from the current resource pool;
    wherein the selection unit is further used for:
        when the current resource pool does not permit the random selection of a transmission resource, randomly selecting a transmission resource from another resource pool; and
    wherein determining whether the current resource pool permits the random selection of a transmission resource comprises:
        acquiring configuration information of the current resource pool from a network device, and when the configuration information of the current resource pool is not successfully obtained from the network device, acquiring the configuration information of the current resource pool from a user card of the terminal or from equipment information of the terminal; and
        determining whether the current resource pool permits the random selection of a transmission resource, according to the configuration information of the current resource pool.

5. The terminal of claim 4, wherein the another resource pool comprises an exceptional resource pool.

6. The terminal of claim 4, wherein the terminal comprises a vehicle user equipment or a pedestrian user equipment with sensing capability.

7. The method of claim 1, wherein acquiring the configuration information of the current resource pool from the network device, comprises:
    receiving the configuration information sent by the network device through a high-level signaling or a system broadcast message.

8. The method of claim 7, wherein the high-level signaling is a radio resource control (RRC) message or a media access control (MAC) control element (CE) message.

9. The terminal of claim 4, wherein acquiring the configuration information of the current resource pool from the network device, comprises:
    receiving the configuration information sent by the network device through a high-level signaling or a system broadcast message.

10. A non-transitory computer readable storage medium, comprising computer-executable instructions that are executable by a computer to perform acts of:
    sensing available resources in a current resource pool;
    when a terminal needs to send data before a sensing result is acquired, determining whether the current resource pool permits random selection of a transmission resource;

when the current resource pool allows the random selection of a transmission resource, randomly selecting a transmission resource from the current resource pool; and when the current resource pool does not permit the random selection of a transmission resource, randomly selecting a transmission resource from another resource pool;

wherein determining whether the current resource pool permits the random selection of a transmission resource comprises:

acquiring configuration information of the current resource pool from a network device, and when the configuration information of the current resource pool is not successfully obtained from the network device, acquiring the configuration information of the current resource pool from a user card of the terminal or from equipment information of the terminal; and determining whether the current resource pool permits the random selection of a transmission resource, according to the configuration information of the current resource pool.

\* \* \* \* \*